US010512990B2

(12) United States Patent
Singh et al.

(10) Patent No.: US 10,512,990 B2
(45) Date of Patent: Dec. 24, 2019

(54) BRAZING COMPOSITIONS AND USES THEREOF

(71) Applicant: Holtec International, Inc., Marlton, NJ (US)

(72) Inventors: Krishna P. Singh, Hobe Sound, FL (US); William G. Scholfield, Ontario (CA); Dmitriy Yakov Kats, San Diego, CA (US); Joseph Paul Mosher, San Diego, CA (US); Robert Charles Sloan, Boardman, OH (US); Thomas G. Haynes, III, Tampa, FL (US)

(73) Assignee: HOLTEC INTERNATIONAL, INC., Marlton, NJ (US)

( * ) Notice: Subject to any disclaimer, the term of this patent is extended or adjusted under 35 U.S.C. 154(b) by 142 days.

(21) Appl. No.: 14/649,241

(22) PCT Filed: Dec. 3, 2013

(86) PCT No.: PCT/US2013/072863
§ 371 (c)(1),
(2) Date: Jun. 3, 2015

(87) PCT Pub. No.: WO2014/089072
PCT Pub. Date: Jun. 12, 2014

(65) Prior Publication Data
US 2015/0306711 A1    Oct. 29, 2015

Related U.S. Application Data

(63) Continuation-in-part of application No. PCT/US2013/022269, filed on Jan. 18, 2013.

(60) Provisional application No. 61/732,751, filed on Dec. 3, 2012.

(51) Int. Cl.
| B23K 35/36  | (2006.01) |
| B23K 35/28  | (2006.01) |
| B23K 35/362 | (2006.01) |
| B23K 35/02  | (2006.01) |

(52) U.S. Cl.
CPC ...... B23K 35/3605 (2013.01); B23K 35/0222 (2013.01); B23K 35/0244 (2013.01); B23K 35/0277 (2013.01); B23K 35/282 (2013.01); B23K 35/286 (2013.01); B23K 35/3601 (2013.01); B23K 35/362 (2013.01); B23K 35/3603 (2013.01)

(58) Field of Classification Search
USPC ......................................................... 148/24
See application file for complete search history.

(56) References Cited

U.S. PATENT DOCUMENTS

| 2,618,234 A | 11/1952 | Armacost | |
| 2,650,420 A | 9/1953 | True | |
| 3,855,682 A | 12/1974 | Chartei | |
| 3,951,328 A * | 4/1976 | Wallace | B23K 35/3605 148/23 |
| 3,971,501 A * | 7/1976 | Cooke | B23K 35/3605 228/248.1 |
| 4,098,957 A * | 7/1978 | Vernam | B23K 35/286 428/654 |
| 4,231,815 A * | 11/1980 | Snyder | B23K 35/025 148/24 |
| 4,895,606 A | 1/1990 | Jafri | |
| 4,949,543 A | 8/1990 | Cottone et al. | |
| 5,173,126 A * | 12/1992 | Ogura | B23K 35/36 148/23 |
| 5,226,974 A * | 7/1993 | Conn | B23K 35/3605 148/23 |
| 5,450,666 A * | 9/1995 | Conn | B23K 35/3605 148/23 |
| 6,196,442 B1 | 3/2001 | Kalem et al. | |
| 6,203,628 B1 * | 3/2001 | Katoh | B23K 35/025 148/23 |
| 6,344,237 B1 | 2/2002 | Kilmer | |
| 6,733,598 B2 | 5/2004 | Swidersky et al. | |
| 7,000,823 B2 | 2/2006 | Dockus et al. | |
| 7,293,602 B2 | 11/2007 | Nadig et al. | |
| 7,850,789 B2 * | 12/2010 | Katoh | B22F 1/0011 148/24 |
| 8,283,049 B2 | 10/2012 | Saisho et al. | |
| 8,283,050 B2 | 10/2012 | Tsuruno et al. | |
| 8,978,962 B2 | 3/2015 | Garcia-Juan et al. | |
| 2002/0005230 A1 * | 1/2002 | Watsuji | B23K 35/025 148/23 |

(Continued)

FOREIGN PATENT DOCUMENTS

| CN | 101284337 | 10/2008 |
| CN | 101365558 | 2/2009 |

(Continued)

OTHER PUBLICATIONS

"An Introduction to Brazing", Sulzer Metco, Issue 3, Aug. 2011.*
Corresponding International Search Report and Written Opinion for PCT/US2013/072863 dated Apr. 18, 2014.
Corresponding Chinese Office Action and Search Report dated Oct. 8, 2016.
International Search Report and Written Opinion, PCT/US2013/22269 dated Apr. 5, 2013, pp. 1-4.
*Brazing Aluminum to Steel- General Topics*, www.aluminium-brazing.com: Aluminum Brazing Blog, Nov. 1, 2010, pp. 1-5.
Cain Industrial Spiral Finned Tubing—Exhaust Heat Recovery Finned Tubing, Cain Industries Heat Recovery Systems, 2000, pp. 1-4.

*Primary Examiner* — Devang R Patel
(74) *Attorney, Agent, or Firm* — The Belles Group, P.C.

(57) ABSTRACT

Described herein are compositions for use in the brazing of metal substrates, methods of making and using these compositions are also described herein. Heat exchangers often have a distributor tube whose external surface is provided with cooling fins. The distributor tube is typically a steel tube coated with a metal having good heat conduction, such as aluminum. The cooling fins themselves also generally comprise aluminum because of its good heat conductivity and low weight.

18 Claims, No Drawings

(56) References Cited

U.S. PATENT DOCUMENTS

| | | |
|---|---|---|
| 2003/0001000 A1 | 1/2003 | Shabtay |
| 2003/0066631 A1 | 4/2003 | Jayaweera et al. |
| 2007/0164088 A1 | 7/2007 | Dianatkhah |
| 2009/0017328 A1 | 1/2009 | Katoh et al. |
| 2009/0095447 A1 | 4/2009 | Podhorsky et al. |
| 2009/0159247 A1 | 6/2009 | Kendall et al. |
| 2009/0165893 A1* | 7/2009 | Akazawa ........... B23K 35/0244 148/24 |
| 2009/0233118 A1* | 9/2009 | Katoh .................. B22F 1/0011 428/553 |
| 2009/0297882 A1* | 12/2009 | Ikeda .................... B23K 35/34 428/675 |
| 2011/0220617 A1 | 9/2011 | Becker et al. |
| 2013/0037957 A1* | 2/2013 | Takahashi .......... B23K 35/3612 257/772 |

FOREIGN PATENT DOCUMENTS

| | | |
|---|---|---|
| CN | 101462208 | 6/2009 |
| CN | 201740440 U | 2/2011 |
| CN | 102764939 | 11/2012 |
| EP | 0795732 A2 | 9/1997 |
| EP | 1004386 | 5/2000 |
| EP | 1535690 A1 | 6/2005 |
| EP | 2002923 A9 | 12/2008 |
| EP | 1758701 B1 | 8/2012 |
| GB | 1171230 | 11/1969 |
| JP | 1133709 | 12/1999 |
| JP | 200637135 | 2/2006 |
| JP | 2007275984 | 10/2007 |
| KR | 100847131 | 7/2008 |
| WO | 2011110532 | 9/2011 |
| WO | 2013109968 | 7/2013 |

* cited by examiner

BRAZING COMPOSITIONS AND USES THEREOF

CROSS-REFERENCE TO RELATED PATENT APPLICATIONS

The present application is a National Stage application under 35 U.S.C. § 371 of International Application No. PCT/US13/72863 filed Dec. 3, 2013, which is a continuation in part of International Application No. PCT/US13/22269, filed Jan. 18, 2013, which claims the benefit of U.S. Provisional Patent Application Ser. No. 61/732,751 filed Dec. 3, 2012, the contents of which are hereby incorporated by reference herein in their entireties.

BACKGROUND

Heat exchangers often have a distributor tube whose external surface is provided with cooling fins. The distributor tube is typically a steel tube coated with a metal having good heat conduction, such as aluminum. The cooling fins themselves also generally comprise aluminum because of its good heat conductivity and low weight.

The bond between the distributor tube and the cooling fins is generally created through a brazing process. Traditionally, the distributor tube was cladded with aluminum or an aluminum-silicon alloy. However, when producing an aluminum cladded tube, intermetallic layers form between the cladding and the base steel material. After forming the cladded tube, the tube must be cleaned for brazing. This cleaning typically involves water based cleaners which need to be dried before the brazing process. The cleaned and cladded tube is then subjected to a secondary heating such that the tube is bonded to the aluminum fins at a brazing temperature of approximately 600° C. Secondary heating increases the thickness of the brittle intermetallic layer which is subject to cracking. Also, during this secondary heating process, the aluminum layer can be thinned from capillary action during brazing to the point where it does not provide sufficient long term corrosion protection for the base steel material.

Accordingly, there is a need for brazing compositions which: (1) eliminate the need for aluminum cladding prior to the brazing process; (2) eliminate the need for a drying step in the brazing process: (3) eliminate the need for secondary heating in the brazing process; (4) reduce or eliminate the intermetallic layer between the cooling tin and the distributor tube; and (5) provide long term corrosion protection.

Embodiments of the present invention are designed to meet these ends.

SUMMARY

In some embodiments, the present invention provides a brazing composition comprising: a metal halide; and from about 40 wt. % to about 65 wt. % of a hydrophobic carrier.

In further embodiments, the present invention provides a multi-component brazing composition comprising: a first component comprising a metal halide; and a hydrophobic carrier; and a second component comprising a filler metal.

Other embodiments provide methods of preparing and using the compositions described herein.

DETAILED DESCRIPTION

As used herein, the term "bonding temperature" refers to the temperature to which a brazing composition must be heated in order to provide, suitable adhesion strength between two substrates, e.g., a permanent bond between an aluminum fin and a steel tube.

In some embodiments, the terms "hydrophobic carrier" and "oil based carrier" may be used interchangeably.

In some embodiments, the terms "brazing composition", "brazing flux" and "flux composition" may be used interchangeably.

Some embodiments of the present invention provide a brazing composition comprising: a metal halide; and from about 40 wt. % to about 65 wt. % of a hydrophobic carrier.

In some embodiments, the metal halide is selected from: potassium fluoride; aluminum fluoride; cesium fluoride; rubidium fluoride; lithium fluoride; sodium fluoride; calcium fluoride; potassium aluminum fluoride; cesium aluminum fluoride; lithium aluminum fluoride; and a combination of two or more thereof. In other embodiments, the metal halide is selected from: potassium aluminum fluoride; cesium aluminum fluoride; lithium aluminum fluoride; and a combination of two or more thereof.

Further embodiments provide a brazing composition further comprising a filler metal. In some embodiments, the filler metal is selected from aluminum, silicon, zinc, an alloy of aluminum and zinc; an alloy of zinc, aluminum and silicon, an alloy of aluminum and silicon; and a combination of two or more thereof.

In some embodiments, the filler metal has an average particle size of from about 1 to about 500 microns. In some embodiments, the filler metal has an average particle size of from 2 to about 100 microns. In other embodiments, the filler metal has an average particle size of from about 3 to about 50 microns. Stilt further embodiments provide compositions wherein the filler metal has an average particle size of from about 4 to about 25 microns. Yet other embodiments provide a composition wherein the filler metal has an average particle size of from about 5 to about 10 microns.

In some embodiments, the filler metal comprises greater than 50 wt. % aluminum. In other embodiments, the filler metal comprises greater than 85 wt. % aluminum.

In some embodiments, the hydrophobic carrier is a liquid at room temperature, in some embodiments, the hydrophobic carrier comprises a vanishing oil.

In some embodiments, the hydrophobic carrier is present in an amount of from about 48 wt. % to about 56 wt. % of the brazing composition. In some embodiments, the hydrophobic carrier is present in an amount of about 53 wt. % of the brazing composition.

In some embodiments, the brazing composition is substantially acrylate-free. In some embodiments, the brazing composition is acrylate-free.

In some embodiments, the brazing composition has a bonding temperature of from about 550° C. to about 650° C. In some embodiments, the brazing composition has a bonding temperature of from about 575° C. to about 625° C. In some embodiments, the brazing composition has a bonding temperature of from about 585° C. to about 600° C. In some embodiments, the brazing composition has a bonding temperature of about 590° C. In some embodiments, the bonding temperature refers to the bonding temperature of the first component and the second component individually. In some embodiments, the bonding temperature refers to the bonding temperature of the multi-component brazing composition when the first and second components are in intimate contact.

In some embodiments, the filler metal is in the form of a flake or a powder.

In some embodiments, the brazing composition further comprises an additive selected from: an anti-oxidant, an anti-corrosive agent, an anti-foaming agent, a viscosity modifying agent, a plasticizer, a tackifier, a binder, as coupling agent, and a combination of two or more thereof.

In some embodiments, the composition is in the form of a paste or a gel.

Further embodiments provide a multi-component brazing composition comprising: a first component comprising: a metal halide; and a hydrophobic carrier; and a second component comprising a filler metal.

In some embodiments, the metal halide and the filler metal have different average particle sizes. In some embodiments, the filler metal has an average particle size that is greater than the average particle size of the metal halide. In some embodiments, the first component and the second component are present in separate phases. In some embodiments, the separate phases are in intimate contact with one another.

In some embodiments, the first component and the second component are separated prior to use. In some embodiments, the second component comprises a substantially planar substrate. In some embodiments, the substantially planar substrate comprises a foil.

In some embodiments, the substantially planar substrate has a thickness of from about 0.010 to about 0.15 inches. In other embodiments, the substantially planar substrate has a thickness of about 0.15 inches.

In some embodiments, the substantially planar substrate has a dimensional stability sufficient to remain substantially planar after contact with a metal substrate (e.g. a cooling fin). In some embodiments, the substantially planar substrate has a filler metal density of about 60 g/m$^2$. The compositions may reduce the time at which brazing temperature must be maintained during the process by at least 10%, which thereby reduces the formation of intermetallics formed between the fins and the steel tube (dissimilar materials).

In some embodiments, the first component has a metal halide density of about 25 g/m$^2$.

In some embodiments, the methods of the present invention employ a flux mixture comprising a powdered flux and a hydrophobic/oil-based carrier. In some embodiments, the brazing composition is substantially anhydrous. In some embodiments, water is not used in the brazing composition/flux mixture. In some embodiments, the methods described herein: (1) eliminate the need to first provide an aluminum clad layer (or otherwise aluminized surface) on the outer surface of the tube far bonding the tube to the fin before beginning the brazing process; (2) eliminate drying of fluxed tubes; and (3) reduce the deleterious intermetallic layer (e.g. FeAl3) between the dissimilar metals which is formed during brazing. The latter is beneficial because FeAl3 is relatively brittle so that it is desirable to minimize the thickness of this layer to avoid joint fracture. The method according to the present disclosure provides long term corrosion protection of the external tube surface after brazing. The methods are applicable to tubes constructed from carbon steels, ferritic stainless steels, austenitic stainless steels, and other steel alloys.

In some embodiments, a brazing composition/flux mixture suitable for brazing aluminum fins onto a bare steel tube is provided. In some embodiments, the flux mixture includes a flux powder comprising a metal halide and a hydrophobic/oil-based carrier. In some embodiments, the oil based carrier comprises an aliphatic hydrocarbon. In some embodiments, the flux powder and oil based carrier form a flux gel or paste suitable for application to an air cooled condenser tube or other structure.

In some embodiments, the tube dimensions can be optimized for varying market conditions based on materials used. For example, a tube width of 9.25 inches (235 mm) by a height of 0.79 inches (20 mm) with a 0.039 inch (1 mm) wall thickness have been determined feasible with SS409 material. The accompanying AL3003 fin is 8.5 inches (215 mm) long, 0.83 inches (21 mm) high, and 0.01 inches (0.25 mm) thick (sheet thickness) placed at a fin pitch of 0.09 inches (2.31 mm).

For application in an air cooled condenser suitable for an industrial use such as in a power generation plant, tube is preferably constructed of steel. Any suitable steel having appropriate heat transfer properties for a given application may be used. In some embodiments, the steel may be stainless steel for corrosion resistance. Non-limiting examples of suitable stainless steels are Grade 409SS or Grade 3Cr12 stainless. Other suitable ferritic or austenitic stainless steels may be used.

An aluminum sheet usable for forming fins according to the present disclosure is a flat element which may be made from aluminum alloy in the 1xxx, 3xxx, 5xxx or 6xxx families as designated by the Aluminum Association, which is adapted and suitable for heat absorption and discharge to a cooling medium flowing past the sheet. In some embodiments, exemplary corrugated fins may be formed from of sheets of Al 3003 material having a thickness of about 0.010 inches.

In some embodiments, the present invention provides a method lot bonding a cooling fin to a distributor tube. In some embodiments, the method for bonding a cooling fin to a distributor tube comprises: providing at least one first structural component in the form of a steel tube (e.g., stainless steel), a brazing composition, optionally a filler metal and at least one other second structural component in the form of an aluminum fin; bringing these components into physical contact; heating these components to a temperature between about 577° C. and 610° C. and maintaining this temperature for a time sufficient to form a brazed bond between the steel tube and the cooling fin.

The method according to the invention is based on the finding that the overall time the braze filler metal is at brazing temperature may be significantly reduced, i.e. by at least 10%, if the flat outer surface of the tube is not coated or clad with aluminum or another material from a previous operation prior to brazing. This reduction of total time at or above the brazing temperature reduces the formation of intermetallics (FeAl3) between the dissimilar materials. The method is also less costly because the finned tube assembly does not have to be dried (to eliminate water) before brazing.

In some embodiments, wherein the brazing composition is a multi-component composition, the first component and second component filler melt together in a single step. This offers the advantage that an aluminum clad material has not been placed through a previous heating cycle before brazing. This reduces cost of manufacture and reduces the negative impact of intermetallic formation because the cladding and brazing process is the same step. There is also power consumption savings on the whole which is accompanied by lower costs.

In those embodiments wherein the filler metal is supplied in the form of a foil sheet, the foil sheet melts during the brazing process and imparts the steel tube with enhanced corrosion protection. In some embodiments, an aluminum silicon coating having a thickness of about 25 microns may be deposited on the steel tube by the brazing process.

In some embodiments, the filler metal has a preponderance of aluminum, as much as 85 weight or more, where the remaining proportion is predominantly silicon. In some embodiments, the filler metal, may contain about 6-12% silicon. Zinc may be added to the filler metal to lower the melting temperature, thereby allowing the brazing to take place at a lower temperature range (540° C. to 590° C.).

In some embodiments, the filler metal is provided as a clad layer hot rolled or otherwise bonded on to an aluminum sheet which forms a cladded fin. In some embodiments the aluminum fin is cladded with an AlSi brazing alloy consisting of about 6 to 12% silicon. In some embodiments, the addition of silicon promotes brazing by reducing the melting temperature of the alloy, decreasing the surface tension and thereby increasing the wettability of the alloy in addition to minimizing the intermetallic alloy (e.g. FeAl3) layer thickness. In some embodiments, the thickness of the AlSi clad layer on the tin sheet metal is between about 10% and 20% of the total thickness of the fin, and preferably about 15%.

In some embodiments, the cladding is an AlSi composition having a silicon content of about 6.8-8.2%. In some embodiments, the fin has a thickness of about 0.012 inches. Other suitable thicknesses of the fin and cladding may be provided.

In some embodiments, the brazing composition is applied between a cladded fin and one or more flat outer surfaces of a steel tube. In some embodiments, this assembly is clamped together and ready for heating in the brazing furnace to bond the fins to the tube.

In some embodiments, the filler metal is added directly to metal halide and hydrophobic carrier. In some embodiments, a powdered AlSi filler is used e.g. aa 4343 (6.8-8.2% Si), as 4045 (9-11% Si), or as 4047 (11-13% Si); and beneficially increases the exterior corrosion protection of the stainless steel. In some embodiments, the filler metal is as 4045 or 4047. In other embodiments, the filler metal is 4045. The appropriate filler metal is selected based upon a number of factors including the environment in which the heat exchanger will reside and the particular brazing process used. For example, heat exchangers located in aggressive environments such as those in salt air or in the vicinity of chemical plants are more prone to corrosion. Specimens subjected to a prolonged ASTM b-117 salt spray test (750 hours) are used to confirm corrosion resistance in marine air environment.

In some embodiments, the brazing processes described herein can be carried out in a commercially available brazing furnace.

A suitable brazing composition such as a fluoride based brazing composition with a cesium or lithium additive, is utilized to sequester the negative effects of the chromium and nickel compounds within the stainless steel parent material. Cesium and or lithium additives to fluoride based fluxes bind and retard the negative effects of chromium and nickel at brazing temperatures. This practice requires a very specific time vs. temperature brazing cycle that is both shorter in duration and lower in temperature. This approach further enhances the braze joint strength and toughness by reducing the intermetallic layer (e.g. FeAl3) thickness within the braze joint Suitable cesium and lithium fluxes are commercially available under the brand name NOCOLOK® from Solvay Fluor GmbH of Hannover, Germany. Advantageously, this eliminates the current genera industrial practice of requiring either a roller clad or aluminized layer on the distributor tube.

The inventors have discovered that using a hydrophobic carrier for the metal halide, rather than water, produces improved brazing performance and adhesion between aluminum fins and bare steel tubes in the brazing furnace. In some embodiments, the hydrophobic carrier advantageously evaporates during processing and therefore does not interfere with the brazing.

A suitable non-aqueous hydrophobic carrier is Evap-lube brand vanishing oil which is commercially available from General Chemical Corporation of Brighton, Mich. This product is in a liquid oil form and has a specific gravity of 0751-0.768 (water=1.0), boiling point of 340-376 degrees F., vapor pressure at 68 degrees F. of 0.5 mmHg, evaporation rate of 0.16, and is 100% volatile by volume.

To prepare the spreadable brazing compositions described herein, a metal halide powder (e.g. NOCOLOK® flux) and an oil based carrier (e.g. Evap-Lube 2200) are admixed. In some embodiments, the relative amounts of each used preferably may be in the ranges of about 40-65% by weight hydrophobic carrier to about 60-35% by weight metal halide, and more preferably about 48-58% by weight hydrophobic carrier to about 52-42% by weight metal halide. In some embodiments, without limitation, about 53% by weight hydrophobic carrier may be used with the remaining weight percentage (47%) of product in the mixture being metal halide or metal halide with additional additives.

The foregoing oil based carder and powdered flux mixtures produce a very viscous flux mixture (similar to a gel or all paper paste in consistency and viscosity) that is readily spreadable on the tubes in preparation for brazing. Advantageously, for the present brazing application, the Evap-Lube 2200 vanishing oil evaporates readily leaving little or no residual oils, and therefore does not interfere with the formation of a brazed bond between the fins and bare steel tube.

A suitable representative application rate of the flux and oil based carrier mixture may be about 25 $g/m^2$ flux to 35 $g/m^2$ of vanishing oil.

In alternative embodiments, a long chain alcohol may be added to further extend and improve the spreadability of the brazing compositions described herein which may be used for longer lengths of bare steel tubes to be prepared for brazing. In certain embodiments, the long chain alcohol may be a polyol (e.g. a glycol including hexylene glycol and propylene glycol). Glycol or another long chain alcohol may be added to the brazing composition/flux and hydrophobic/oil-based carrier mixture in amount from about and including 25% by weight or less in some embodiments, or alternatively in a range of 1-25% by weight in other embodiments. In some embodiments, if a glycol or another long chain alcohol is added to the flux mixture, the weight percentage of the oil based carrier used is preferably reduced proportionately while maintaining the same weight percentage of flux powder in the mixture to provide optimum brazing performance and bonding.

In using the vanishing, oil and fluoride based flux brazing mixture gel to prepare a braze filler metal delivery system in which the filter metal is mixed directly into the flux, the flux mixture comprises NOCOLOK® flux, Evaplube vanishing oil e.g. Evap-Lube 2200), and powdered aluminum. In various embodiments, the aluminum content of the flux gel/paste may be in the range of about 10-50% Al powder by weight. In one representative example, for illustration, approximately 60 $g/m^2$ of aluminum powder may be added which may be AlSi in some embodiments. To make an aluminum preparation having a paste-like consistency for mixing with the flux gel, approximately 90 g/m² of Evap-lube may added to that amount of aluminum powder. Approximately 25 g/m2 NOCOLOK® flux and about 35 g/m² Evap-Lube 2200 are used in the oil based carrier flux gel mixture, as described above. Adding up all of the foregoing constituents, the aluminum powder is therefore about 30% of the total (210 g/m²) filler metal-flux gel mixture by weight in this example when combined to form a flux gel or paste that is applied to the bare tube surfaces.

In one embodiment, the aluminum particle size of the aluminum or AlSi power may be without limitation about 5-10 microns.

In some embodiments, the brazing compositions described herein are applied immediately after the tube is cleaned to prevent reoccurrence of oxide formation on the tube. In some embodiments, a binder may be added to the brazing composition/flux mixture to dry it for handling.

The invention will be described in greater detail by way of specific examples. The following examples are offered for illustrative purposes and are not intended to limit the invention in any manner. Those skilled in the art will readily recognize a variety of noncritical parameters, which can be changed or modified to yield essentially the same results.

EXAMPLES

Example 1

Provided below in Table 1 are exemplary single-component brazing, compositions of the present invention.

TABLE 1

| Ingredient | I | II | III | IV |
|---|---|---|---|---|
| | Wt. % | | | |
| Potassium aluminum fluoride | 31 | 40 | 37 | 38 |
| Evap-lube 2200 | 65 | 53 | 47 | 40 |
| AlSi | 3 | 5 | 15 | 7 |
| Propylene glycol | 1 | 2 | 1 | 15 |

Example 2

Provided below in Table 2 are exemplary multi-component brazing compositions of the present invention.

TABLE 2

| Ingredient | I | II | III | IV |
|---|---|---|---|---|
| | Wt. % | | | |
| First Component | | | | |
| Potassium aluminum fluoride | 34 | 40 | 40 | 45 |
| Evap-lube 2200 | 65 | 53 | 49 | 40 |
| Propylene glycol | 1 | 7 | 11 | 15 |
| Second Component | | | | |
| Aluminum | 50 | 75 | 84 | 88 |
| Silicon | 40 | 21 | 11 | 10 |
| Zinc | 10 | 4 | 5 | 2 |

It is intended that any patents, patent applications or printed publications, including books, mentioned in this patent document be hereby incorporated by reference in their entirety.

While the invention has been described and illustrated in sufficient detail that those skilled in this art can readily make and use it, various alternatives, modifications, and improvements should become readily apparent without departing from the spirit and scope of the invention.

The invention claimed is:

1. A brazing composition consisting of a non-aqueous blend of:
   a metal halide;
   from about 40 wt. % to about 65 wt. % of a hydrophobic carrier; and
   propylene glycol in an amount ranging from about 1 wt. % to about 25 wt. % based on the total weight of the brazing composition.

2. The brazing composition of claim 1, wherein the metal halide is selected from: potassium fluoride; aluminum fluoride; cesium fluoride; rubidium fluoride; lithium fluoride; sodium fluoride; calcium fluoride; potassium aluminum fluoride; cesium aluminum fluoride; lithium aluminum fluoride; and a combination of two or more thereof.

3. The brazing composition of claim 1, wherein the hydrophobic carrier is a liquid at room temperature.

4. The brazing composition of claim 1, wherein the composition is acrylate-free.

5. The brazing composition of claim 1, having a bonding temperature of from about 550° C. to about 650° C.

6. A brazing composition consisting of:
   a non-aqueous mixture of: a metal halide; a hydrophobic carrier; and a glycol selected from the group consisting of hexylene glycol, propylene glycol, and combinations thereof; and
   a filler metal having greater than 50 wt. of aluminum based on the total weight of the filler metal.

7. The composition of claim 6, wherein the filler metal has an average particle size that is greater than the average particle size of the metal halide.

8. The brazing composition of claim 6, wherein the non-aqueous mixture and the filler metal are maintained separately prior to use and the filler metal is a substantially planar substrate.

9. The brazing composition of claim 6, wherein the metal halide is selected from: potassium fluoride; aluminum fluoride; cesium fluoride; rubidium fluoride; lithium fluoride; sodium fluoride; calcium fluoride; potassium aluminum fluoride; cesium aluminum fluoride; lithium aluminum fluoride; and a combination of two or more thereof.

10. The brazing composition of claim 6, wherein the filler metal is selected from aluminum, silicon, zinc, an alloy of aluminum and zinc; an alloy of zinc, aluminum and silicon, an alloy of aluminum and silicon; and a combination of two or more thereof.

11. The brazing composition of claim 6, wherein the filler metal has an average particle size of from about 1 to about 500 microns.

12. The brazing composition of claim 6, wherein the filler metal has greater than 85 wt. % aluminum based on the total weight of the filler metal.

13. The brazing composition of claim 6, wherein the hydrophobic carrier is present in an amount of from about 48 wt % to about 58 wt % of the non-aqueous mixture.

14. The brazing composition of claim 6, wherein the glycol is present in an amount ranging from about 1 wt. % to about 25 wt. % based on the total weight of the first component.

15. The brazing composition of claim 6, having a bonding temperature of from about 550° C. to about 650° C.

16. The brazing composition of claim 8, wherein the substantially planar substrate has a thickness of from about 0.010 to about 0.15 inches.

17. The brazing composition of claim 11, wherein the filler metal has an average particle size of from about 1 to about 25 microns.

18. The brazing composition of claim 17, wherein the filler metal has an average particle size of from about 1 to about 10 microns.

* * * * *